(12) United States Patent
Montoya et al.

(10) Patent No.: US 12,475,917 B1
(45) Date of Patent: Nov. 18, 2025

(54) DEVICES AND METHODS FOR DEGAUSSING MAGNETIC RECORDING STORAGE MEDIA

(71) Applicant: THE REGENTS OF THE UNIVERSITY OF CALIFORNIA, Oakland, CA (US)

(72) Inventors: Sergio A. Montoya, La Jolla, CA (US); Frederick E. Spada, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/667,943

(22) Filed: May 17, 2024

(51) Int. Cl.
*G11B 5/024* (2006.01)
(52) U.S. Cl.
CPC .................. *G11B 5/0245* (2013.01)
(58) Field of Classification Search
None
See application file for complete search history.

(56) References Cited

U.S. PATENT DOCUMENTS

| | | | | |
|---|---|---|---|---|
| 4,396,668 A * | 8/1983 | Saito | ...................... | G11B 5/706 360/134 |
| 4,467,389 A * | 8/1984 | Knipp | .................. | G11B 5/0245 361/151 |
| 4,882,718 A * | 11/1989 | Kryder | .............. | G11B 11/10517 |
| 5,416,664 A * | 5/1995 | Becker | .................. | H01F 13/006 361/151 |
| 5,721,665 A * | 2/1998 | Schultz | ................ | G11B 5/0245 361/267 |
| 5,959,824 A * | 9/1999 | Schultz | ................ | G11B 5/0245 361/267 |
| 5,969,933 A * | 10/1999 | Schultz | ................ | G11B 5/0245 361/267 |
| 7,164,569 B1 * | 1/2007 | Thiel | .................... | G11B 5/0245 361/150 |
| 8,023,218 B2 * | 9/2011 | Zhou | .................... | G11B 5/1278 360/59 |
| 10,438,614 B1 * | 10/2019 | Wang | ........................ | H01F 6/06 |
| 11,682,422 B1 * | 6/2023 | Rajaie | .................... | G11B 5/465 360/66 |
| 12,190,924 B1 * | 1/2025 | Poss | ...................... | G11B 7/1263 |
| 2004/0037597 A1 * | 2/2004 | Haseba | .............. | G03G 15/2053 399/328 |
| 2007/0019355 A1 * | 1/2007 | Ito | ........................ | G11B 5/0245 361/143 |
| 2007/0247776 A1 * | 10/2007 | Tamura | ................ | G11B 5/0245 |
| 2011/0199712 A1 * | 8/2011 | Schultz | ................ | G11B 5/0245 361/143 |
| 2012/0230169 A1 * | 9/2012 | Shimazawa | .......... | G11B 5/6088 360/59 |

(Continued)

*Primary Examiner* — Fred Tzeng
(74) *Attorney, Agent, or Firm* — Eleanor Musick; Torrey Pines Law Group, PC (57) ABSTRACT

An improved degaussing system for sanitizing data stored in a magnetic storage device (MSD) includes a magnetic field generating element configured to generate a directional field toward a media tray for retaining the MSD. Heating elements disposed proximate to the media tray heats the MSD to an elevated temperature before or during application of a magnetic field. An insulating element at least partially encloses the heating elements to isolate the magnetic field generating element from the heating element.

19 Claims, 8 Drawing Sheets

(56) References Cited

U.S. PATENT DOCUMENTS

| | | | | |
|---|---|---|---|---|
| 2015/0279416 A1* | 10/2015 | Tabata | ................... | G11B 5/465 |
| | | | | 369/13.22 |
| 2022/0208219 A1* | 6/2022 | Rajaie | ................... | H01F 13/006 |
| 2024/0112856 A1* | 4/2024 | Liu | ..................... | H01F 41/0266 |
| 2024/0388225 A1* | 11/2024 | Katori | ..................... | F25B 21/00 |
| 2025/0044014 A1* | 2/2025 | Zhang | ..................... | F25D 17/08 |

\* cited by examiner

| Degauss Cycle | | | | | Stages [QTY] |
|---|---|---|---|---|---|
| Input + Heat + Field + Cool + Output | | | | | 1 |
| Input + Heat + Field | | | Cool + Output | | 2 |
| Input | Heat | Field | Cool + Output | | 3 |
| Input + Heat | | Field | Cool | Output | 4 |
| Input | Heat | Field | Cool | Output | 5 |

| Temp (K) | $H_{sat}(T)$ | $H^r_{sat}(T)$ | $H_c(T)$ | $H^r_c(T)$ |
|---|---|---|---|---|
| 300 | 5.34 | 5.43 | 3.07 | 3.39 |
| 400 | 4.17 | 4.13 | 2.10 | 2.25 |
| 500 | 2.68 | 2.80 | 1.02 | 1.33 |
| 550 | - | 1.95 | - | 0.51 |
| 600 | 1.07 | 1.52 | 0.05 | 0.26 |

FIG. 7

DEVICES AND METHODS FOR DEGAUSSING MAGNETIC RECORDING STORAGE MEDIA

GOVERNMENT RIGHTS

This invention was made with government support under Contract H98230-17-C-0096 awarded by the U.S. Department of Defense. The government has certain rights in the invention.

FIELD OF THE INVENTION

The invention relates to the sanitization of data stored in magnetic storage devices and more particularly to devices that employ in-plane or perpendicular magnetic anisotropy materials as the magnetic recording medium.

BACKGROUND

Large-scale computing systems play a pivotal role in the ability to address complex problems that impact our society, economy, healthcare, science, and national security. Applications range from modeling biological and chemical processes that enable realizing new drug discoveries, solving fundamental questions regarding subatomic building blocks of matter, up to maintaining the integrity and safety of the U.S. nuclear weapon stockpile. These computing systems also constitute a foundational component of the cloud, an ever-growing ecosystem of interconnected devices and systems, which maintains information and communication technologies that allows us to create, process, transfer, and store digital information.

Magnetic storage technologies, such as hard disk drives (HDDs) and magnetic tape drives, are used as the primary storage devices in both large-scale computing systems and data centers because they facilitate high reliability and high-density nonvolatile data storage in small-form factor devices which are relatively low cost while having larger storage capacity compared to other storage technologies (e.g., FLASH, solid-state drives, etc.). In general, data is stored in a magnetic recording medium within the magnetic storage device (MSD) as magnetic patterns (i.e., the MSD contains write head devices, which produce localized applied fields that change the polarities of magnetic grains in the magnetic recording medium in a controlled manner to create the magnetic patterns, and also read head devices which, recovers data using a field-sensitive sensor that detects the polarities of the magnetic grains within the written magnetic patterns). To meet the ever-growing data storage demands of the digital era, HDD manufacturers are constantly adjusting MSD product features (e.g., magnetic recording medium, data encoding schemes, error correction codes, read/write devices, among many other) to increase areal density, read/write speeds, reliability, and total product storage capacity. Current HDD manufacturers, including SEAGATE®, TOSHIBA®, and WESTERN DITIGAL®, primarily use conventional magnetic recording (CMR) media (also known as conventional perpendicular magnetic recording media) which includes at least a recording layer (perpendicular magnetic anisotropy material) and a soft underlayer (in-plane magnetic anisotropy material). Although CMR media has facilitated increasing areal densities from ~160 Gb/in$^2$ (in 2006) up to ~1,100 Gb/in$^2$ (in 2022), CMR media is approaching its maximum areal density capability.

Given the increasing demand for larger capacity storage devices, HDD manufacturers have been developing a new generation of HDD products that will utilize a new type of magnetic recording medium-termed energy assisted magnetic recording (EAMR) media-which is projected to enable achieving areal densities up to ~2,600 Gb/in$^2$ [SEAGATE® 2021 Analyst Day]. Such areal densities require the use of a recording layer material with higher perpendicular magnetic anisotropy than CMR media which, in turn, necessitates higher applied magnetic fields to reverse the polarity of magnetic grains compared to CMR media. Since HDD read/write heads can only produce write perpendicular fields on the order of ~1.2 Tesla [1 Tesla=10,000 Oe], EAMR HDD products will also incorporate novel read/write heads that energetically and locally modify the properties of magnetic grains in the recording medium either via heat, if "heat assisted magnetic recording" (HAMR) media is used, or via microwave fields, if "microwave assisted magnetic recording" (MAMR) media is used, to facilitate writing magnetic patterns on EAMR media.

Magnetic storage devices that eventually fail or are decommissioned are separated from the host server or array or other computer device and need to have the functionality of the data bearing components destroyed so that the data is no longer accessible. This process must be verified to meet cyber security regulations. Secure sanitization is defined as the removal of information from the storage device so that previously stored data cannot be recovered using any known technique or analysis. Secure sanitization entails erasure of data stored in the MSD, as well as the removal of all labels, markings, and activity logs. The method of sanitization varies depending upon the MSD in question and may include degaussing, incineration (smelting), shredding, grinding, or embossing.

At present, secure sanitization of HDD storage devices containing CMR media can be performed via degaussing, shredding, or smelting techniques. A degausser instrument typically exposes the entire magnetic storage device to a near-uniform and high amplitude magnetic field generated by either a permanent magnet assembly or an electromagnet solenoid coil. Some degausser instruments are designed such that their high amplitude magnetic fields can only be applied directly to the magnetic recording medium itself (e.g., HDD media disks) after extraction from the MSD, and are therefore unsuitable for rapid sanitization of large quantities of MSDs. The amplitude of the magnetic field required is dependent on the magnetic properties of the magnetic recording medium, as well as the direction of the applied magnetic field relative to the plane of the magnetic recording medium. For modern CMR media, easy-direction fields are directed normal to the magnetic recording medium plane, while hard-direction fields are parallel to the magnetic recording medium plane. Almost all current degaussing instruments generate magnetic fields along the hard-direction of CMR media. Because MSD manufacturers typically modify the magnetic properties of the magnetic recording medium to facilitate improvements in MSD reliability and areal density, the magnetic field magnitude needed to sanitize HDDs has been increasing. In 2022, the minimum field magnitude needed for sanitizing CMR media was ~1.6 Tesla if applied along the magnetic recording medium hard-direction and ~1.2 Tesla if applied along the magnetic recording medium easy-direction. Degausser instruments are preferred for securely disposing of all varieties of MSDs because they permanently erase all written magnetic patterns from the magnetic recording medium, render the MSD unusable, and are available in a variety of form factors for sanitizing small, medium, and large quantities of MSDs. In contrast, shredder instruments do not erase the written magnetic patterns from the magnetic recording medium, but instead break down the entire MSD into smaller pieces. Magnetic recording media fragments created by the shredding process may still contain large amounts of data. As of April 2024, secure sanitization of HDDs via shredding requires instruments capable of achieving a 2 mm or smaller particle size [See "NSA/CSS Evaluated Product List for Hard Disk Drive Destruction Devices", April 2024]. If the 2 mm maximum shred size cannot be achieved, HDDs must first be sanitized using an appropriate degaussing instrument prior to shredding or deformation. Given the packaging robustness of HDD products, shredder instruments capable of producing 2 mm particles are very expensive, suffer from reliability issues due to their mechanical complexity, have high-power consumption, and require a significant footprint to setup/operate. No shredder is currently approved to securely sanitize any MSD containing HAMR media. Sanitization using smelting techniques is achieved by heating the entire MSD to temperatures which decompose or melt all device components. Smelting techniques for secure sanitization are very expensive, consume large amounts of power, and require large-scale infrastructure not typically available near most data centers.

To securely sanitize MSDs based on future EAMR storage technologies via degaussing techniques, a new generation of degausser instruments capable of producing significantly higher magnetic fields than present degaussers is required to ensure all written magnetic patterns on the EAMR media are permanently erased. Permanent magnetic pattern erasure is achieved by exposing the magnetic recording medium to magnetic field magnitudes such that the magnetic moments of all magnetic grains in the magnetic recording medium become aligned along the same direction (i.e., the magnetic recording medium is magnetically saturated). In recent experimental studies, prototype HAMR media specimens at room temperature required hard-direction DC magnetic fields up to 9 Tesla to fully saturate all magnetic grains in the HAMR media. This hard-direction field requirement is up to four times higher than the maximum fields produced by current commercially available degausser instruments. Based on these results, practical considerations make it apparent that conventional modifications to typical degausser design features, such as increasing number of turns of the electromagnet coil, increasing total charge capacity of capacitor banks in electromagnet degaussers, or changing permanent magnet material and/or assembly configuration in permanent magnet degaussers, will not increase the generated magnetic field magnitudes to the levels required for secure sanitization of HAMR media.

A superconducting electromagnet might be capable of supplying the required high magnitude magnetic fields needed to sanitize EAMR storage devices, however, such a system has several disadvantages. First, superconducting electromagnets utilized in scientific instruments typically can only generate high DC magnetic field magnitudes within tightly controlled small volume environments (1 in$^3$) which are unable to accommodate MSDs. Extending the superconducting coil concept to apply a suitable uniform field over a much larger volume, such as that of an MSD (4"×6"×1.5"), is not trivial and would require significant research and development efforts to yield a commercially-suitable product. Second, if a DC superconducting electromagnet degausser is developed, the system will likely be suitable for only processing small numbers of MSDs due to restrictions on the sweep rates of the magnetic field to avoid quenching the superconducting magnet when increasing and decreasing the magnetic field. Repeatedly charging and discharging a superconducting electromagnet also results in boiloff of the cryogenic liquid needed to maintain the superconducting state of the superconducting electromagnet, requiring subsequent recapture or replenishment of lost cryogen liquid. Recapture and replenishment of the cryogen liquid are time consuming processes, and maintaining a cryogenic liquid supply is expensive. If a superconducting electromagnet degausser is designed to generate high amplitude AC magnetic field pulses, alternating high magnitude field impulses can be expected to eventually cause irreversible damage to the superconducting coil windings and system wiring by subjecting the coil assembly to rapidly changing strong forces which cause deformation of the coil windings and constriction of the coil into the space occupied by the MSD. This phenomenon has already been observed in currently available electromagnet degaussers which generate ~2 Tesla fields (~4.5 times lower than the hard-direction fields required to sanitize EAMR media) and will likely become more pronounced as degausser field magnitudes increase. Additionally, it is well established that large nonuniform stray magnetic fields present near both ends of the superconducting coil create a safety hazard if nearby unsecured ferrous materials/components are allowed to interact with the stray field gradient and become transformed into high-speed projectiles. Significant changes to degausser design and architecture changes would thus be required to address these issues.

In 2023, SEAGATE® began commercial shipments of second-generation HAMR HDD products with storage capacities of 30 TB and beyond. With enterprise HDD product lifetimes typically being ~3-4 years, there is an urgent need for an efficient and reliable commercial degaussing instrument that can securely sanitize MSDs employing emerging EAMR technologies to meet the data sanitization needs of academic, commercial, and government data centers. The inventive devices and methods are directed to this need.

SUMMARY

According to embodiments of the inventive devices and methods, heating elements capable of achieving partial or full demagnetization of CMR, EAMR, and HAMR media are combined with magnetic field generating elements. The magnetic fields may be applied along one or both magnetic recording medium easy- and hard-directions. In some embodiments, a thermal insulator is disposed between the magnetic and heating elements to minimize radiative and conductive heat transfer between the elements. The magnitudes of the magnetic fields applied along the magnetic recording medium easy- and hard-directions required to fully-saturate all magnetic grains in the magnetic recording medium can be significantly reduced by heating the magnetic recording medium to moderate temperatures while serially or simultaneously exposing the magnetic recording medium to the magnetic field.

The inventive scheme utilizes a combination of externally applied heat and magnetic fields onto the magnetic storage device (MSD) to irreversibly erase magnetic data and servo patterns present on the recording layer of the magnetic recording medium contained in the MSD. This combination approach provides a solution for secure sanitization of next-generation EAMR storage technologies including HAMR and MAMR media, which are anticipated to replace current CMR media in HDDs in the near future. Overall, the inventive devices and methods provide a high efficiency, low cost, and compact apparatus for proper disposal of MSDs containing EAMR media at the end of their product life-cycles.

In one aspect, a degaussing system for sanitizing data stored in an MSD includes: a magnetic field generating element configured to apply a magnetic field to the MSD disposed within the system; and one or more heating elements disposed proximate to the MSD, the one or more heating elements configured to heat the MSD to an elevated temperature for a period of between 30 seconds and 1 hour before or during application of the magnetic field. The degaussing system may further include an insulating structure for thermally isolating the one or more heating elements from the magnetic field generating element. In some embodiments, in the insulating structure is a vacuum enclosure with enclosure walls having a vacuum therein. The insulating structure may include an enclosure configured to enclose the one or more heating elements and a tray configured to retain the MSD, and wherein the insulating structure is enclosed within the magnetic field generating element. In some embodiments, the elevated temperature is within a range of 400K to 650K or higher and may be within a range of 500K to 650K. The magnetic field generating element may be an electromagnet solenoid coil configured to generate a directional field toward a center of the coil, wherein the MSD is disposed at the center of the coil. In some embodiments, the electromagnet solenoid coil applies the magnetic field along the recording media hard-direction and/or along the recording media easy-direction. The magnetic field generating element may be configured to generate a magnetic field in the range of 1 Tesla to 5 Tesla or higher. In some embodiments, the system may further include a cooling system configured to cool the MSD after completion of degaussing of the MSD. The one or more heating elements may be from one to four elements, wherein a heating element is disposed on at least one side of the MSD.

In another aspect, an improved degaussing system for sanitizing data stored in a magnetic storage device (MSD), where the system includes a magnetic field generating element configured to generate a directional field toward a media tray for retaining the MSD, the improvement includes one or more heating element disposed proximate to the media tray, the one or more heating element configured to heat the MSD to an elevated temperature for a period of between 30 seconds and 1 hour before or during application of the magnetic field; and an insulating element at least partially enclosing the one or more heating element to isolate the magnetic field generating element from the one or more heating element. The insulating element may be a vacuum enclosure with enclosure walls having a vacuum therein. In some embodiments, the elevated temperature is within a range of 300K to 650K or higher and may be within a range of 400K to 650K. In some embodiments, the system may further include a cooling system configured to cool the MSD after completion of degaussing of the MSD.

In still another aspect, a method for sanitizing data stored in a magnetic storage device (MSD) includes: disposing the MSD in a media tray of a degaussing system; heating the MSD and the media tray to a predetermined temperature for a period of between 30 seconds and 1 hour; after or concurrently with heating, activating a magnetic field generating element to apply a magnetic field to the MSD; cooling the MSD; and removing the MSD from the system; wherein the magnetic field generating element is thermally isolated from a heating element that heats the MSD and media tray. The thermal isolation may be provided by a vacuum insulating element. The predetermined temperature may be within a range of 300K to 650K or higher.

DETAILED DESCRIPTION OF EMBODIMENTS

Figure 1A:
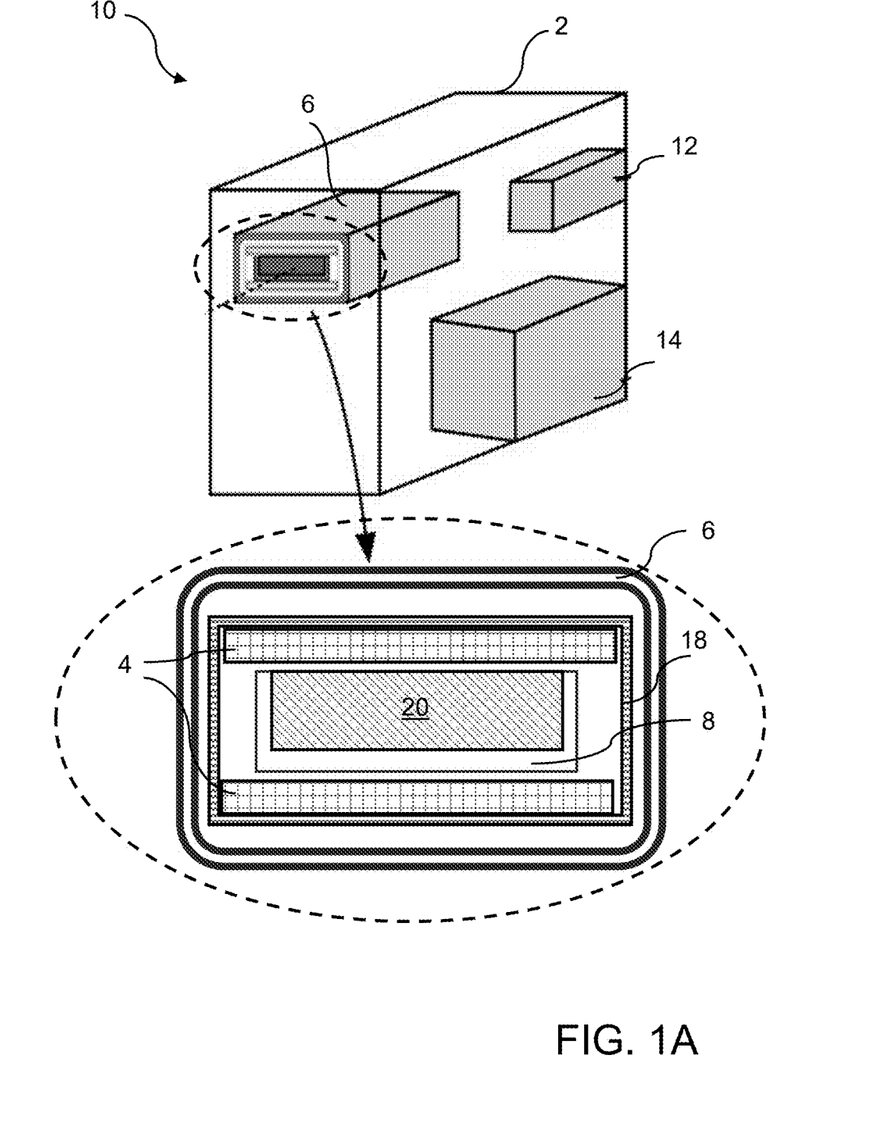
FIG. 1A diagrammatically illustrates a first embodiment of the inventive sanitization apparatus with relevant components listed.

In an exemplary embodiment shown in the diagram of FIG. 1A, a degaussing device 10 includes a chassis 2 which supports/houses one or more heating element 4, a magnetic field generating element 6, an electronic circuit element 12 (i.e., control circuitry), media tray 8, capacitor bank 14. Not shown are connections to a power supply, e.g., a power cord for connection to an electrical outlet for providing power for operation of the various elements of the device. Control circuitry may include a processor or other programmable control module for generating signals for activating components of the system, for receiving and processing feedback signals from sensors for use in control of the system components, and for collecting processing information. The control circuitry may further process signals from the sensors for display on a display device of a user interface (not shown) to provide information to a system operator and may be connected to a memory device to store and process data. The user interface may include an input device to allow the user to enter process parameters and other relevant data.

Figure 1B:
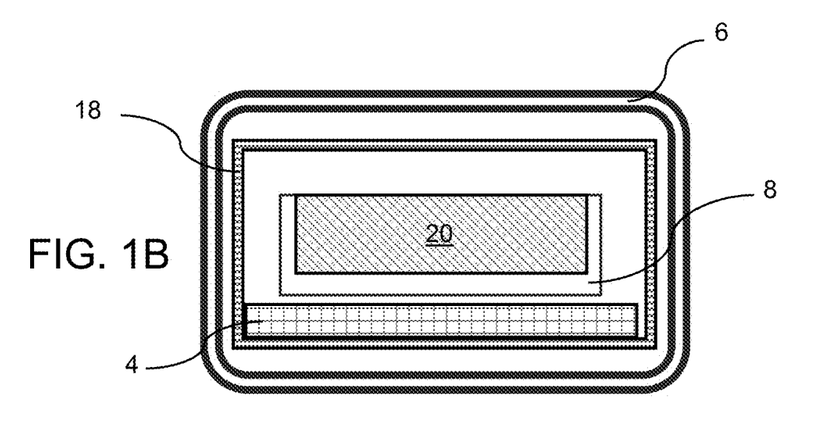
FIGS. 1B-1D illustrate different implementations of the first embodiment with heater elements located, respectively, below, above, and surrounding the magnetic storage drive.
Figure 1C:
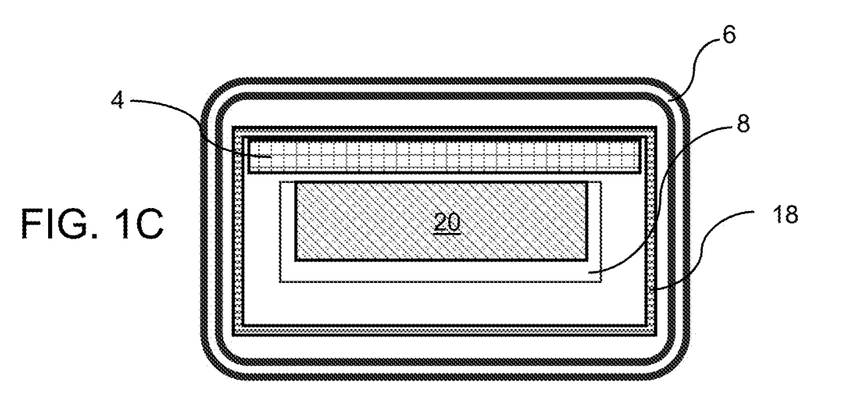
Figure 1D:
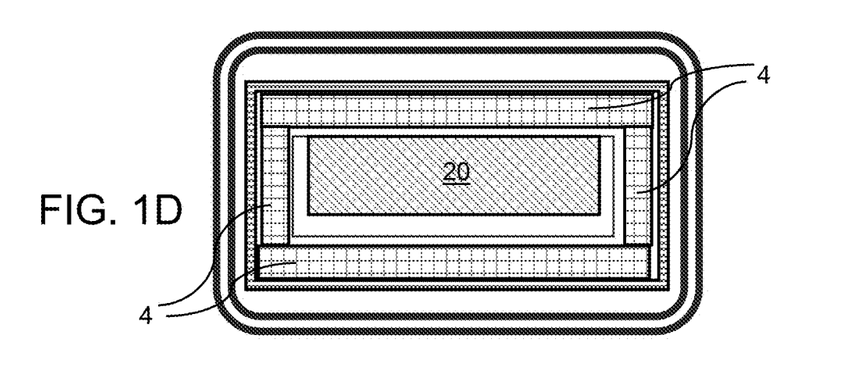

Variations on the number and positioning of the heating element(s) 4 are shown in FIGS. 1B-1D, where the heating element(s) are shown positioned below, above, and on four sides of media tray 8.

Insulating structure 18 provides at least partial thermal isolation between heating element(s) 4 and magnetic field generating element 6, which may be an electromagnet solenoid coil configured to generate a directional field. In the illustrated example, the electromagnet coil applies the magnetic field along the magnetic recording medium hard-direction. The thermal insulation prevents warming of the magnetic field generating element 6 by conducted and radiated heat from the heating element(s) 4, thereby avoiding detrimental impacts on the magnitude of field generated by the field generating element.

Overall, inventive device 10 employs a similar architecture to electromagnet-based degausser instruments that are known in the art, but with important modifications that enable the level of sanitization required for advanced magnetic storage devices (MSDs). The first of these modifications is heater element(s) 4 which is/are used to thermally treat the MSD 20, which is placed in the media tray 8, up to moderate heating temperatures that are well below any metal melting point. A second modification is insulating structure 18, which, in some embodiments, may be formed from a thermal insulating material such as ceramic and fiber insulators that are commonly used in heating equipment, e.g., industrial ovens, with appropriate dimensions to enclose the heating elements and media tray along with any needed mechanical components for accessing the tray for placement of the MSD. The outer dimensions of structure 18 are selected to fit within the interior of magnetic field generating element 6. A preferred construction for the insulating structure 18 is a double-walled assembly in which the inner and outer walls are spaced apart to define a sealed vacuum spacing between the walls, e.g., a vacuum flask or dewar. The sealed space between the walls is evacuated to reduce thermal conductivity in the vacuum space. The vacuum spacing could be evacuated and permanently sealed using a pinched valve or capped with an isolation valve to enable pump-down at a future time. An exemplary pressure within the vacuum spacing will be within a range of $10^{-3}$ and $10^{-7}$ Torr, or better. The material of which the insulating structure is formed is diamagnetic or low permeability so as not to interfere with the magnetic field that reaches the MSD, while tolerating the elevated temperatures generated by the heating element(s). Appropriate materials include, for example, quartz glass, aluminum, titanium, or stainless steel. Insulating structure 18 acts to isolate the magnetic field generating element 6 from conducted and radiated heat emanating from the heating element(s) 4 and any other components that may be heated by the heating element. As shown in FIGS. 1A-1D, vacuum housing 18 encloses heating element(s) 4 and media tray 8.

Media tray 8 may employ a variety of mechanisms to provide access for inserting and removing the MSD. Such mechanisms include sliding drawers or trays that can be pulled out of insulating structure 18 on one or more slide mechanisms (not shown). In some embodiments, the combined assembly of the insulating structure, heating element(s) and media tray may be mounted on a conveyor mechanism that moves the entire combination along a belt or track through the magnetic coil. Other permutations and combinations for insertion/removal of the MSD and exposure of the MSD to thermal and magnetic field processing will be apparent to those of skill in the art based on the examples described herein.

The combined magnetic and thermal processing provided by the inventive device provides efficient sanitization of EAMR storage technologies via degaussing techniques that are enhanced by raising the temperature of the magnetic recording medium inside the MSD, thus lowering the magnetic recording medium magnetization and anisotropy, and consequentially reducing the magnitude of the applied magnetic field needed to fully saturate the magnetic recording medium magnetization along the medium easy- and hard-directions.

Figure 2:
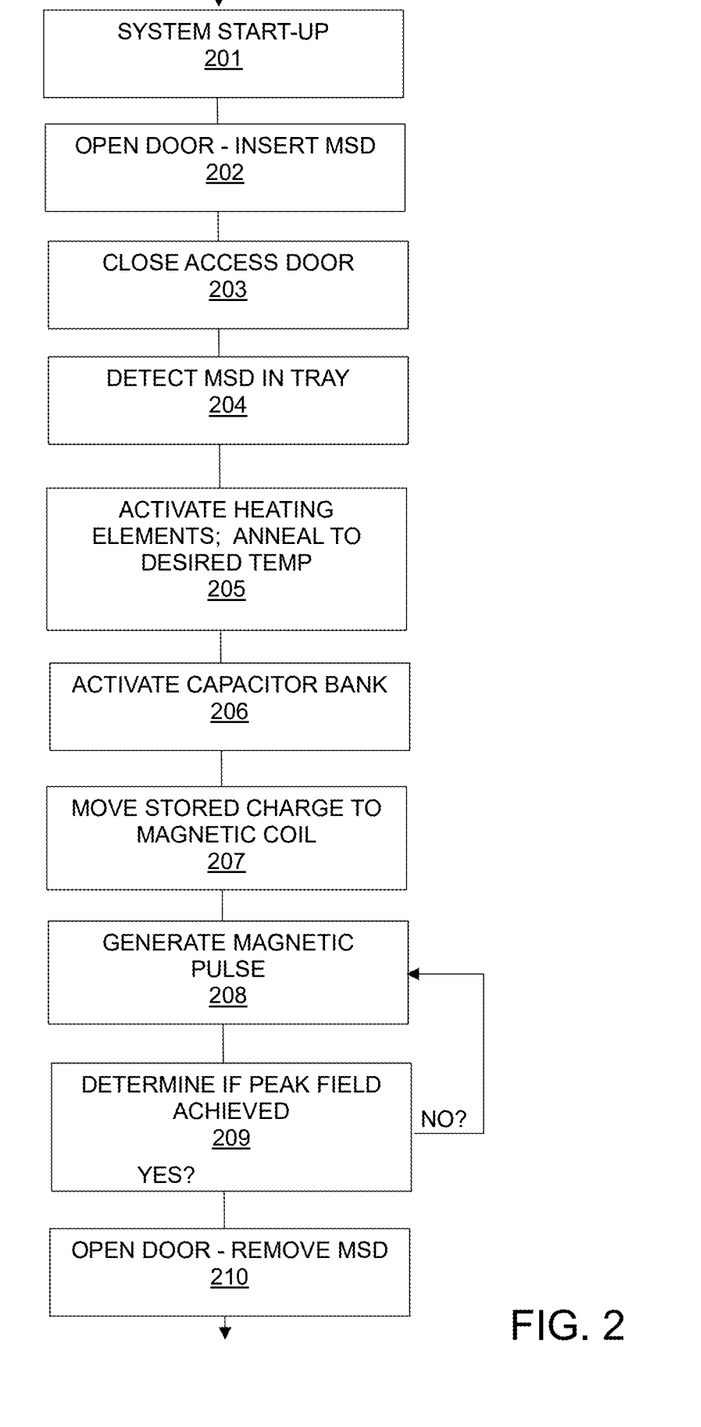
FIG. 2 is a flow diagram of a sanitization process performed using an embodiment of the inventive system.

FIG. 2 provides a sample process flow using the embodiment shown in FIG. 1A:

Step 201: After powering 'ON' the apparatus, the electronic circuit element 12 performs routine checks to confirm all critical elements are operating properly (e.g., confirms the response of different critical elements is within bounds to ensure safe operation of the proposed apparatus).

Step 202: To sanitize a magnetic storage device (MSD) 20, an operator (i.e., user of the proposed apparatus) would gain access to the media tray 8 by opening a door or panel located on the front or top of the chassis/housing 2. Depending on the tray configuration, the user slides the tray outward through the door and positions the MSD into the media tray. This step could potentially involve deactivating a switch interlock intended to prevent opening of the apparatus when any active element (e.g., heater element(s), magnetic field generating element, capacitor bank element, etc.) is being operated to safeguard the operator. Internal checks would be operated by controllers on the electronic circuit element 12.

Step 203: After an operator physically places the MSD 20 inside the media tray 8, the operator can then return the media tray 8 to its original position within the apparatus 10. Different media tray sizes could facilitate accommodating a variety of MSD form factors.

Step 204: After the media tray 8 is returned to its original position, the prior open/close interlock switch advises the electronic circuit element 12 that an MSD has been placed inside the media tray 8 and the degaussing cycle can start.

Step 205: The electronic circuit element 12 activates the heater element(s) 4 to heat the MSD to a predetermined heating temperature and for a predetermined time to ensure all magnetic recording media within the MSD reaches the predetermined temperature. Temperature sensor(s) disposed within or close to the media tray and feedback may be used to ensure that the MSD achieves the predetermined heating temperature for the predetermined time. The period of time for which the MSD is maintained at elevated temperature is the minimum time required for all surfaces of the magnetic recording medium within the MSD to attain a specified temperature and will depend on certain design features of the degaussing system (e.g., distance between the MSD and the heater element(s), etc.) Demagnetization (partial or full) of the specimen occurs almost immediately upon reaching the specified temperature. While the duration of the overall heating operation will vary depending on the structural and operational characteristics of an individual system, the heating time will typically be on the order of 30 seconds to 1 hour or more, depending on the target temperature, the selected degauss cycle permutation, the thermal coupling between the MSD and heater element(s), and specific physical design of the media tray. The predetermined heating temperature will typically be in excess of the minimum temperature required to sufficiently alter the magnetic properties of the magnetic recording medium under a given applied field. To illustrate, three different scenarios are described below, each assuming that (1) an operator wants to sanitize a magnetic storage device with EAMR media that requires 5 Tesla hard-direction magnetic field at room temperature, but the magnetic recording medium is known to require a 2 Tesla hard-direction applied field when it is heated to a minimum temperature of 250° C., and (2) the proposed degaussing apparatus 10 contains a magnetic field generating element that can only generate a 2 Tesla hard-direction maximum applied field and heater element(s) that can heat the MSD up to 300° C.

Scenario 1. If the proposed degaussing apparatus heats the EAMR medium in the MSD below the minimum temperature, then full erasure of all magnetic patterns on media in the device will require a >2 Tesla hard-direction applied magnetic field magnitude, which is above the maximum field magnitude generated by the apparatus magnetic field generating element. In this scenario, the apparatus cannot properly sanitize the MSD.

Scenario 2. If the inventive degaussing apparatus heats the EAMR medium in the MSD to the minimum temperature, then the degaussing apparatus can properly sanitize the MSD. However, ideal conditions are required in this scenario because degausser performance can be altered by unpredictable factors arising from degausser design tolerances, quality control standards employed by the degausser manufacturer, and environmental conditions during degaussing operations which can impact sanitization efficacy.

Scenario 3. If the inventive degaussing apparatus heats the EAMR medium in the MSD above the minimum required temperature, the medium can be expected to require a <2 Tesla hard-direction applied magnetic field magnitude to fully saturate all magnetic grains and therefore erase all magnetic patterns present on the magnetic recording medium. This operating scenario can be employed to accommodate fluctuations in apparatus performance, variation of EAMR medium magnetic properties, operator errors, and permit reliable sanitization of MSDs.

As the heater element(s) 4 heats the MSD on the media tray 8, the vacuum housing element 18 prevents heat dissipation to the magnetic field generating element 6.

Step 206: After the MSD 20 is heated to a predetermined temperature for the predetermined time, the electronic circuit element 12 activates the capacitor bank element 14 which then charges a collection of capacitors to a predetermined charge level. At this point the heater element(s) 4 can either be left powered 'ON' to ensure the temperature of the MSD 20 does not significantly change or powered 'OFF' if thermal losses are minimal.

Step 207: Once the electrical circuit element 12 feedback loop determines the capacitor bank element 14 has successfully charged the capacitors, the electrical circuit element 12 closes a switch (e.g., thyristor) which moves the stored energy from the capacitor bank element to the magnetic field generating element 6. If in Step 206 the heater element(s) 4 was left powered 'ON' while the capacitor bank element 14 was charging, the power to the heater element(s) is powered 'OFF' before the electrical current originating from the capacitor bank element 14 is discharged to the magnetic field element 6.

Step 208: The magnetic field generating element 6 then guides the electrical current originating from the capacitor bank element 14 into a properly configured multiturn electromagnetic coil surrounding the media tray 8. Discharging the high-power electrical current through the electromagnet coil results in a high amplitude magnetic field pulse. The magnitude and waveform of the magnetic field pulse is dependent on how quickly energy stored in the capacitor bank element is discharged through the solenoid coil of the magnetic field generating element. The electromagnetic solenoid coil is designed such that the entire MSD on the media tray is exposed to the predetermined magnetic field. In other words, the minimum peak field magnitude generated by the inventive apparatus is applied to the entire volume where the MSD is located.

A properly calibrated field sensor placed at or near the electromagnetic solenoid coil may be used to enable detection of the generated magnetic field magnitude, thus serving as another input for feedback/control loops in the electronic circuit element 12 used to monitor the operation of the system 10. A screen display on the device could also be used to indicate the magnetic field detected by the field sensor(s), confirming that the magnetic field generating element generated the desired magnetic field pulse.

Step 209: After the magnetic field generating element has produced the magnetic field pulse, the electronic circuit element determines whether the discharged magnetic field pulse meets previously determined peak field thresholds via feedback loops. If the electronic circuit determines the detected peak magnetic field is below the required and expected peak magnetic field the degausser notifies the operator via the screen display and either ceases operation or attempts another degaussing cycle. In the event the degausser attempts another degaussing cycle, the electronic circuit element activates the heater element(s) to heat the MSD to a predetermined heating temperature and for a predetermined time to ensure all magnetic recording media within the magnetic storage drive reaches the predetermined temperature. The electronic circuit element proceeds with the next step if it determines the detected peak magnetic field meets/exceeds the required peak magnetic field.

Step 210: After the electronic circuit element confirms all active critical elements are offline (i.e., powered 'OFF'), the magnetic media tray can be opened, and the MSD can be carefully removed by the operator.

A number of variations and optional features may be included in the inventive system, particularly for commercial applications and/or for economic reasons, e.g., reduced manufacturing cost, to provide less expensive options for smaller scale applications, etc. Several of these variations are described below:

In some embodiments, the magnetic field element 6 may be configured within the electromagnet degausser to apply a magnetic field along the magnetic recording media easy-direction (perpendicular to the plane of CMR and EAMR media) instead of along the magnetic recording medium hard-direction (parallel to the plane of CMR and EAMR media). When the magnetic field is applied along the magnetic recording medium easy-direction, saturation of all magnetic grains in the medium occurs at significantly lower magnetic field magnitudes than in the original embodiment where the field was applied along the magnetic recording medium hard-direction. In this case, a degaussing apparatus with reduced energy requirements (i.e., reduced magnetic field output, reduced heating temperature) may be employed, translating directly to reduced fabrication costs.

As an alternative to using an electromagnet coil for magnetic field generating element, the inventive system can employ properly configured arrays of permanent magnets to generate the required DC magnetic field to erase all the written magnetic patterns on the magnetic recording medium. The use of permanent magnets reduces power requirements of the degaussing system at the expense of weight (permanent magnet arrays can be relatively heavy). In one implementation, the permanent magnets can be used to apply a field along the hard-direction of the magnetic recording medium. In a second implementation, permanent magnets can be configured to apply a magnetic field along the easy-direction of the storage medium. In a third scenario, a combination of different permanent magnet arrays can be used to subject the MSD to magnetic fields along the easy- and hard-directions of the magnetic recording medium.

Since the proposed apparatus will heat the MSD to moderate elevated temperatures, the use of a physical switch that latches/prevents the media tray element from being opened during the degaussing cycle may be included as a safeguard for the system operator.

The system may incorporate an optional closed-cycle chilled water supply that is used to cool the media tray and MSD after completion of the degaussing cycle. Alternatively, or in addition, the system may incorporate one or more fans to draw colder air from the environment and direct it to the media tray and MSD to accelerate cooling.

Since it is important that the degaussing apparatus produce a nearly uniform magnetic field across the entire volume within which the MSD is placed, the media tray 8 may also include high permeability components (e.g., steel, mu-metal, ferrous materials, etc.), commonly referred as magnetic flux guides, that enable reconfiguring the magnetic field flux that emanates from the magnetic field generating element 6. For example, the use of this design feature at the front and rear of the media tray 8 enables reconfiguring the magnetic fields near the open-ended sides of the solenoid electromagnetic coil interior (i.e., the magnetic field generating element 6) where the MSD is placed for secure data sanitization.

In some embodiments, one or more heating element(s) 4 may be directly incorporated into the media tray 8 to enhance the modularity of the system. This design feature allows an operator to repair failed heater elements via simple replacement of the media tray (with an embedded heater) instead of requiring more involved disassembly/repair of the entire proposed degausser apparatus. Such a feature also allows for upgrading the media tray with higher power heaters and improved heat management to more efficiently process future MSDs containing recording media with higher magnetic anisotropy as the EAMR media evolves. A modular media tray having both a low cost "no heater element" option and higher cost "with heater element" option) can also allow operators to select different operating modes with the same degausser apparatus based on their needs: sanitization of MSD containing only CMR media (not requiring heating to elevated temperatures) or sanitization of MSDs containing EAMR media (requiring heating to moderate elevated temperatures).

As an alternative implementation, the insulating structure 18 consists of a combination of thermal insulating material elements and a vacuum housing element (not shown) to efficiently confine and direct the heat generated by the heater element(s) 4 onto the MSD 20 and minimize direct/indirect heat dissipation from the heater element(s) 4 to the magnetic field generating element 6. This design feature enables the limited heating capacity of the heater element(s) 4 to be efficiently transferred to the MSD 20, thus minimizing the power demand on the heater element(s) power supply, and consequentially reducing the size and weight of the overall degaussing device 10. By properly engineering the thermal packaging of the heater element(s), the direct heat conduction from the heater element(s) to one or more of the vacuum housing element walls can further be reduced, further minimizing thermal losses as well as direct/indirect heat dissipation to the magnetic field generating element 6.

Figure 3A:
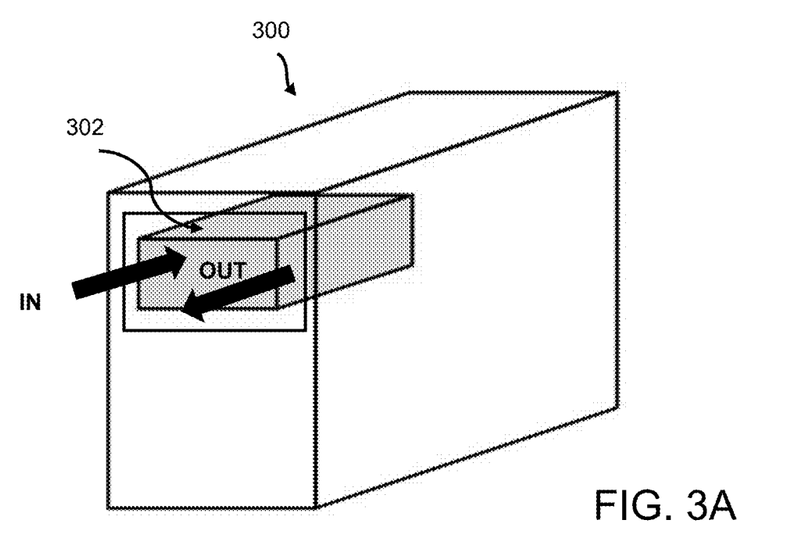
FIGS. 3A-3B diagrammatically illustrate different magnetic storage device input/output architectures according to embodiments of the inventive system.
Figure 3B:
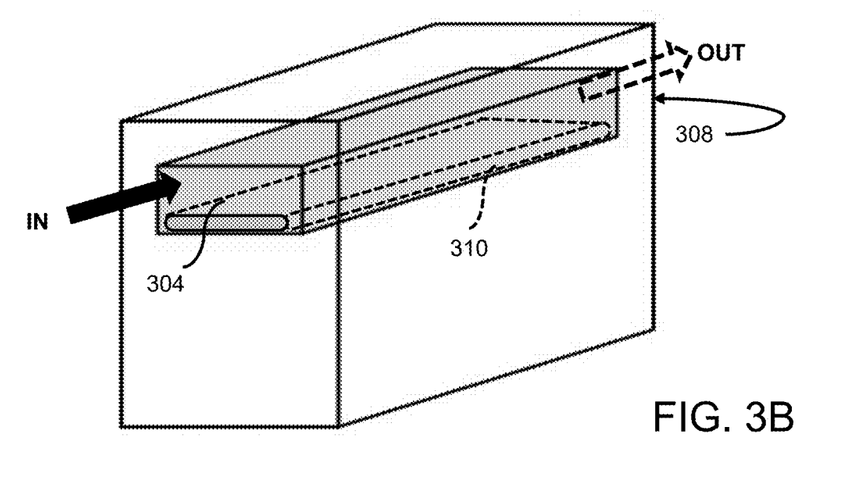
Figure 3C:
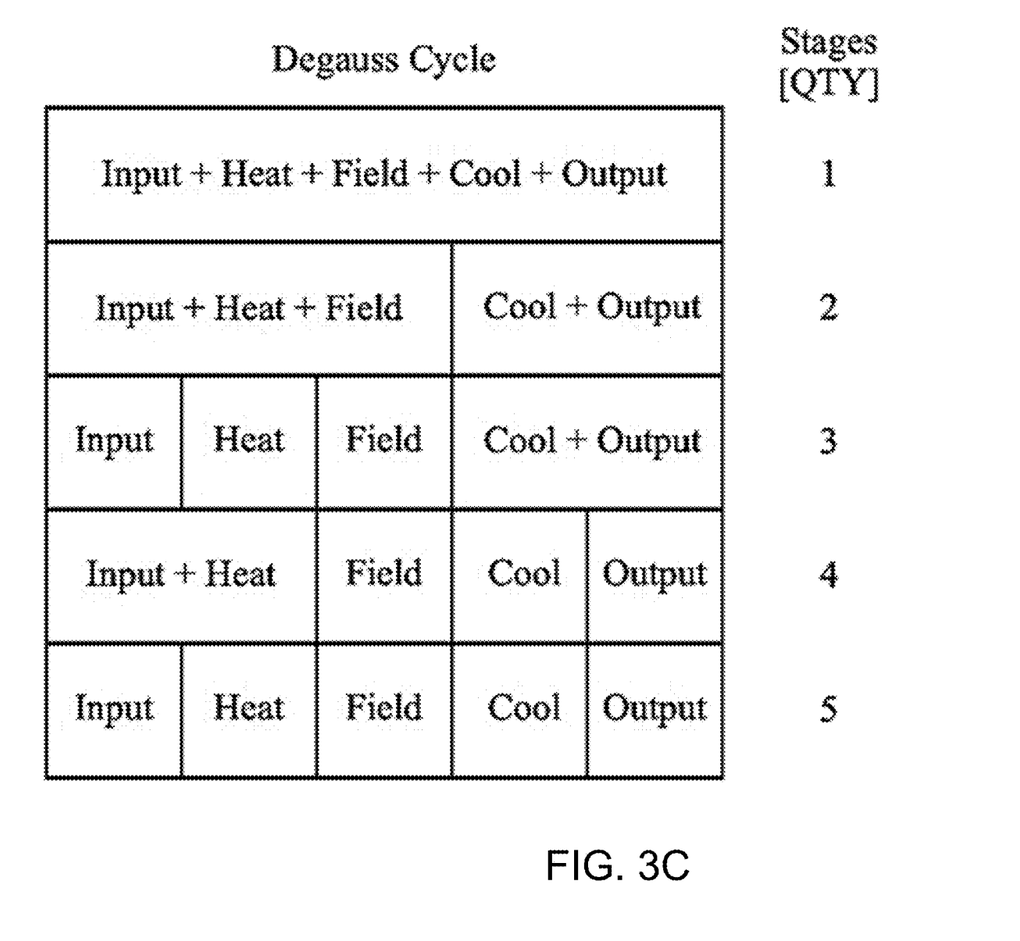
FIG. 3C schematically illustrates various permutations of degauss cycles with different numbers of stages.

In one embodiment, a degausser apparatus capable of continuously processing MSDs can be provided for use in datacenter environments where a large number of magnetic storage devices may need to be processed daily. Instead of utilizing the system architecture 300 of FIG. 3A, where the input, heating, degauss, and output stages occurs in the same physical volume 302, accessed through the same door or panel, a conveyer belt 310 could facilitate moving the MSD from the input stage 304 across multiple other environment stages that heat, apply field, cool, or perform a combination of these processes in any one stage, before the device exists in the output stage 308, as shown in FIG. 3B. FIG. 3C provides examples of various permutations with different numbers of stages that could be utilized to perform the appropriate steps, i.e., input, heat, apply field, cool, and output a magnetic storage device.

Still another embodiment of the inventive system employs a vertically stacked architecture in which gravity forces are used to displace the MSD(s) from the input stage across multiple other environment stages that heat, apply field, cool, or perform a combination of these processes in any one stage before the device exits to the output stage at the lowest level of the stack. In this embodiment, the proposed apparatus does not require a discrete media tray to hold/secure the magnetic storage device. Instead, the MSD is placed on a "trap door" at the input stage. Mechanical switch(es) associated with the trap door are activated to release the MSD to drop to another trap door at the next stage for processing, where each stage will have an associated trap door and switch mechanism that is activated to release the MSD once processing is completed at a given stage. Release of the MSD to the next stage may be based on a predetermined time for completion of the particular processing step, or sensors may be provided to provide feedback to the controller which, upon determining that the step is complete, activates the switch to release the magnetic storage drive to the next stage.

Figure 4:
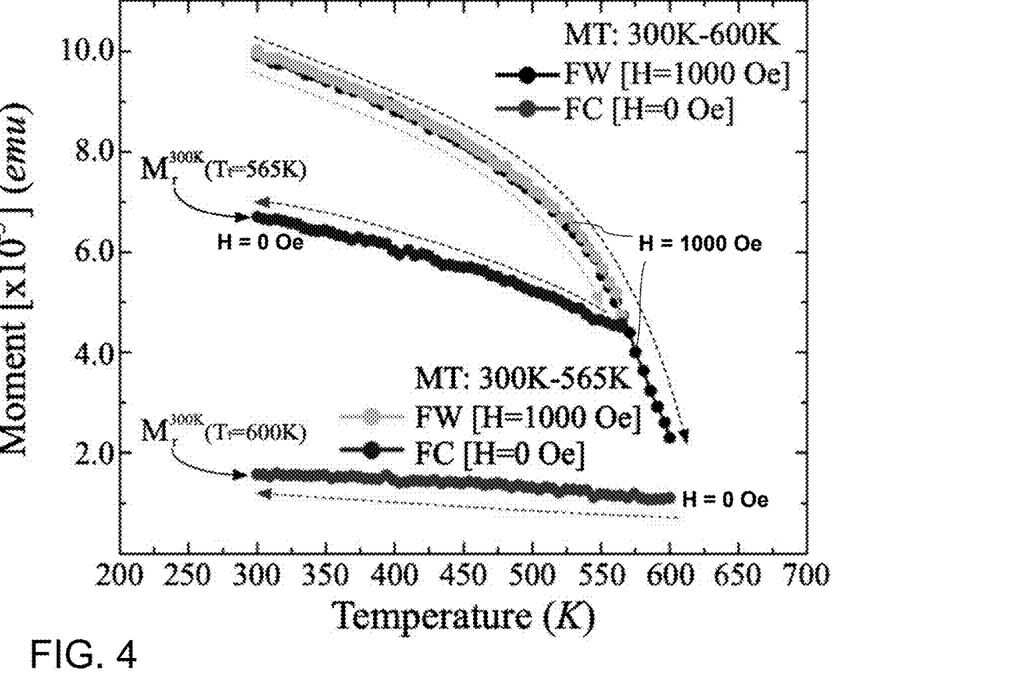
FIG. 4 plots thermal demagnetization of HAMR media under different thermal cycles.
Figure 5:
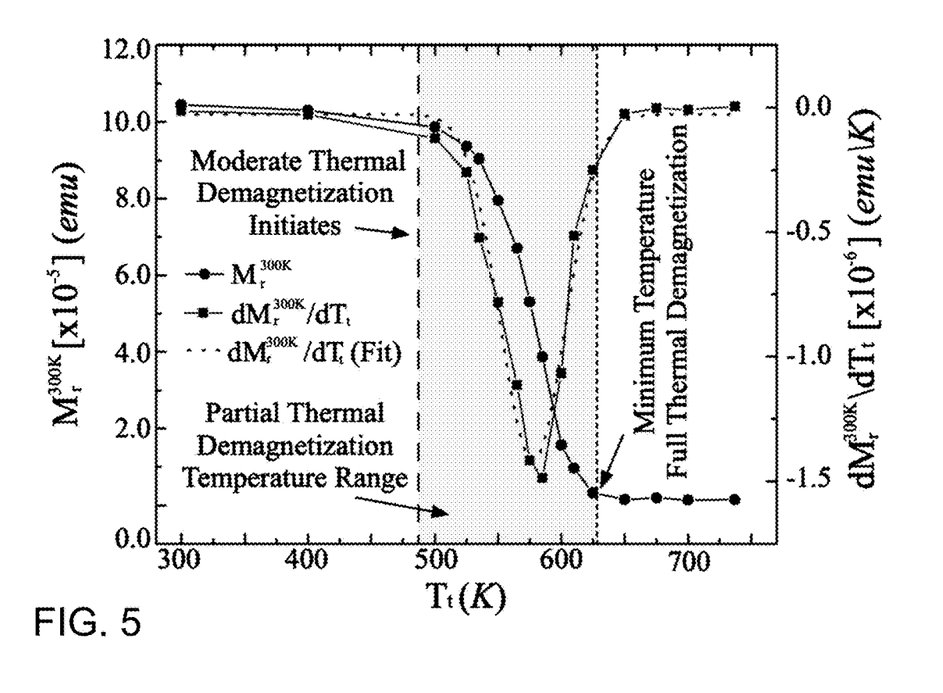
FIG. 5 is a plot comparing HAMR media sanitization at different heating temperatures.
Figure 6:
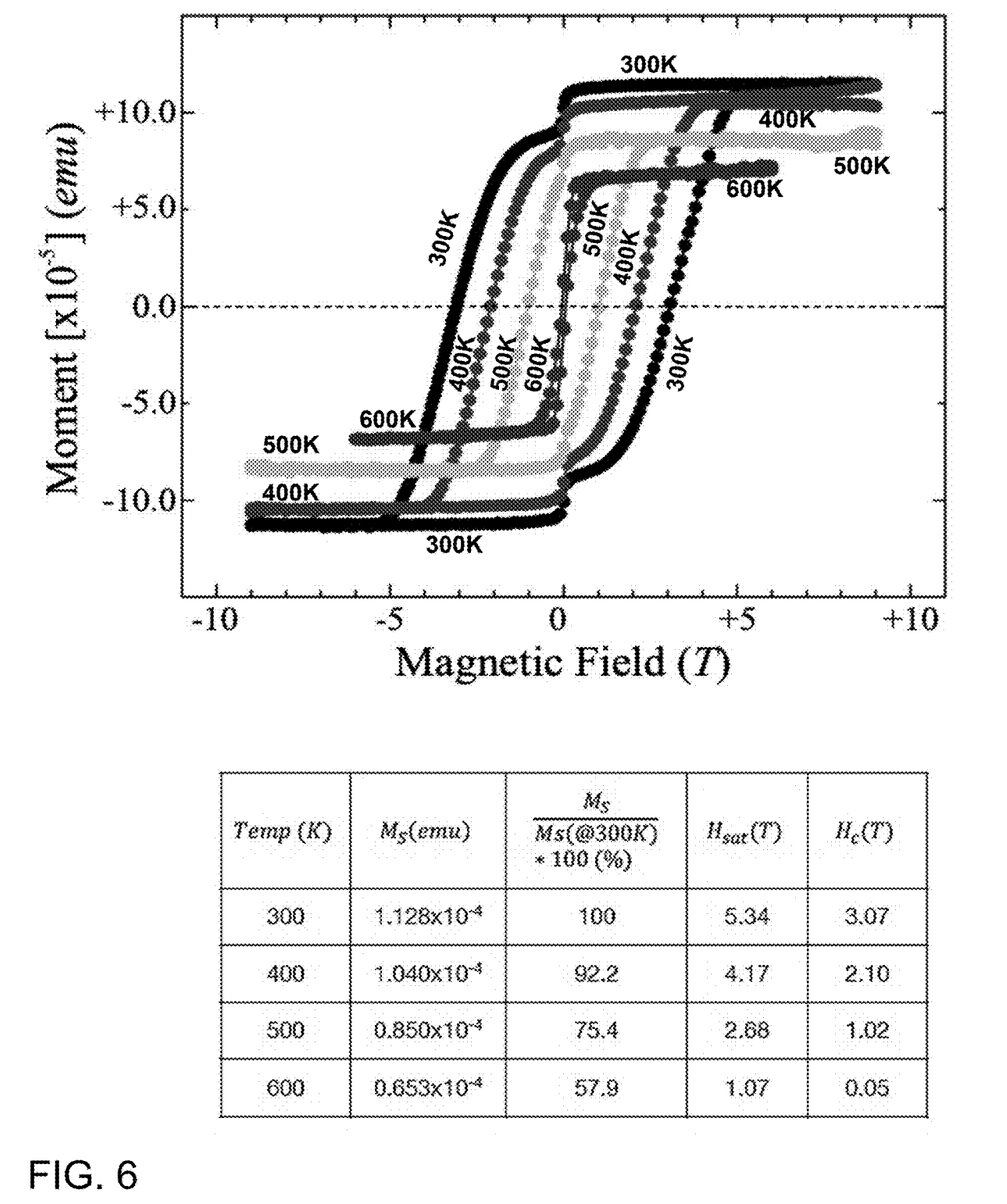
FIG. 6 plots easy-direction magnetic hysteresis loops of HAMR media at different temperatures.
Figure 7:
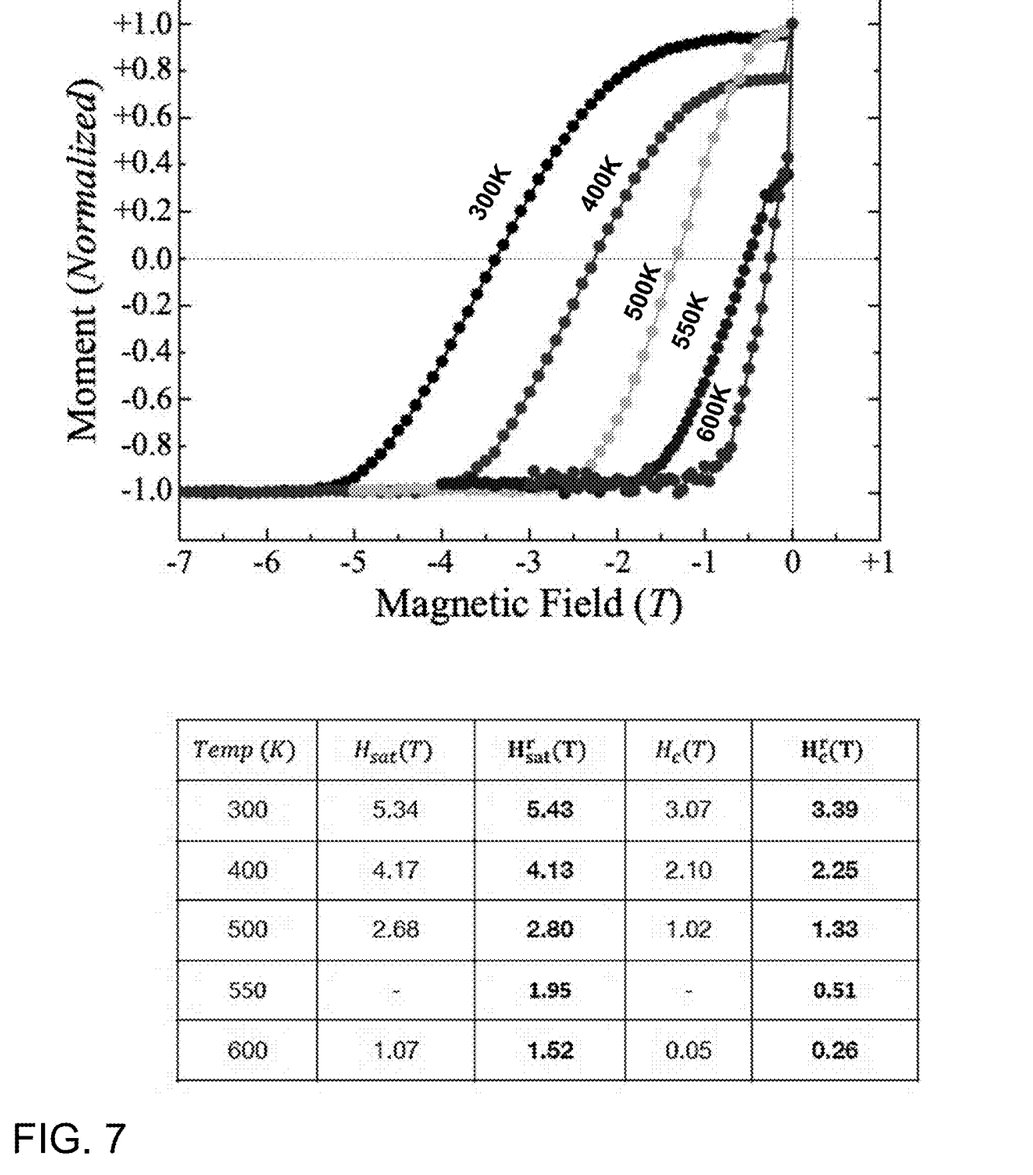
FIG. 7 plots easy-direction remanent DC demagnetization loops of HAMR media at different temperatures.

As previously described, the temperatures employed in the inventive thermal demagnetization process are relatively moderate, when compared to the temperatures required in the absence of an applied magnetic field. To illustrate the efficacy of the inventive process, a prototype HAMR media specimen was exposed to a single degauss cycle using a Data Security, Inc. HD-5T Degausser instrument at room temperature (300K). The 2.6 Tesla field generated by the degausser failed to alter any factory-written magnetic patterns in the specimen. Another previously undegaussed prototype HAMR media specimen was then exposed to thermal processing at temperatures ranging from 300K (26.85° C.) to 740K (466.85° C.) in the absence of an applied magnetic field, and also to different applied easy-direction magnetic field protocols while maintained at various elevated temperatures ranging from 300K (26.85° C.) to 600K (326.85° C.). FIG. 4 compares magnetization vs. temperature (M-T) thermal cycling experiments which were performed to quantify the decrease of the room-temperature (300K) remanent moment ($M_r^{300K}$) of a magnetically saturated prototype HAMR media specimen caused by heating the specimen to two different target heating temperatures, $T_t$=565K and $T_t$=650K, and then cooling the specimen to 300K. The prototype HAMR media specimen was magnetically saturated at 300K in a +7 Tesla field applied along the specimen easy-direction before each M-T experiment, which consisted of a Field Warming (FW) stage during which a weak magnitude magnetic field [H=1000 Oe] is applied along the prototype HAMR media specimen easy direction as it is heated up to $T_t$, reducing the applied field to zero when the prototype HAMR media specimen attains $T_t$, and a Field Cooling (FC) stage during which the prototype HAMR media specimen is cooled from $T_t$ to 300K in the absence of an applied field. FIG. 5 plots $M_r^{300K}$ vs. $T_t$ and $dM_r^{300K}/dT_t$ for the prototype HAMR media specimen using data obtained from several different M-T thermal cycle experiments having selected target temperatures in the range 300K≤$T_t$≤750K. As shown, in the absence of an applied magnetic field thermal demagnetization of prototype HAMR media specimen initiates at $T_t$~500K, partial thermal demagnetization occurs between ~500K and ~600K (with the $dM_r^{300K}/dT_t$ plot indicating ~50% thermal demagnetization occurring at ~585K), and full thermal demagnetization occurs at or above ~650K. FIG. 6 compares the easy-direction magnetic hysteresis loops of the prototype HAMR media specimen obtained at temperatures within the range 300K≤T≤750K. The hysteresis loops show the convoluted responses arising from both the recording layer and soft underlayer of the specimen as the magnetic field is swept from positive to negative magnetic saturation of the medium specimen, and vice versa, and demonstrates clearly show that the saturation field $H_{sat}(T)$ required for secure sanitization decreases as specimen temperature increases. FIG. 7 plots the remanent direct current (DC) demagnetization loops of the prototype HAMR media specimen at different temperatures within the same temperature range, again showing the convoluted responses arising from both the recording layer and soft underlayer of the specimen. Each curve depicts the minimum remanent saturation field $H_{sat}^{r}$ (T) needed to magnetically saturate all the magnetic grains of the specimen under easy-direction magnetic fields, as well as the remanent coercivity field ($H_C^{r}$) at which 50% of the total specimen magnetization is switched, for each selected temperature. Taken together, the results presented in FIGS. 4-7 demonstrate the efficacy of combining thermal processing with an externally applied magnetic field to reduce both the magnetic field magnitude and temperature required for securely sanitizing HAMR media.

The inventive system and method can be used to sanitize MSDs spanning multiple generations including, but not limited to, those that contain obsolete longitudinal magnetic recording media (manufacturing discontinued in 2007), CMR media (first introduced in 2005 and continuing to be used in current high-density magnetic storage products), and emerging EAMR media. The inventive approach employs mature technologies/concepts to develop a system capable of sanitizing emerging EAMR storage devices. By externally heating the MSD, the inventive approach does not require the application of very high external magnetic fields that may pose safety hazard and health concerns. For example, an electromagnet degausser instrument producing very high magnetic fields, e.g., above 3 Tesla, may create stray magnetic fields which are detrimental to personnel wearing field-sensitive instruments such as pacemakers or devices and which interact with nearby ferrous materials/objects, potentially causing such materials/objects to become high-speed projectiles.

The inventive approach described herein does not require the magnetic field element to produce magnetic fields which match or exceed the room-temperature applied magnetic field requirements to fully reverse the orientation of magnetic moments of all magnetic grains in EAMR media either along the easy- or hard-direction. By heating the MSD, the required applied magnetic field can be significantly reduced to match peak magnetic fields produced by present permanent or electromagnet degaussers. The use of an insulating structure, e.g., vacuum housing element, ensures that heat from the heater element(s) does not directly/indirectly affect the magnetic field generating element, which helps prevent degradation of the performance of the magnetic field generating element due to repeated heating. The thermal isolation provided by the insulating structure allows potentially building permanent magnetic and electromagnet based degausser instruments to sanitize EAMR storage devices.

While the foregoing descriptions and accompanying drawings set forth functional aspects of the disclosed system, no particular arrangement of elements for implementing these functional aspects should be inferred from the illustrative examples unless explicitly stated or otherwise clear from the context. All such variations and modifications are intended to fall within the scope of this disclosure.

The invention claimed is:

1. A degaussing system for sanitizing data stored in a magnetic storage device (MSD), the system comprising:
   a magnetic field generating element configured to apply a magnetic field to the MSD disposed within the system;
   one or more heating elements disposed proximate to the MSD, the one or more heating elements configured to heat the MSD to an elevated temperature for a period of between 30 seconds and 1 hour before or during application of the magnetic field; and
   a thermal insulating structure configured to thermally isolate the one or more heating elements from the magnetic field generating element.

2. The degaussing system of claim 1, wherein the thermal insulating structure comprises a vacuum enclosure comprising enclosure walls having a vacuum therein.

3. The degaussing system of claim 1, wherein the thermal insulating structure comprises an enclosure configured to enclose the one or more heating elements and a tray configured to retain the MSD, and wherein the insulating structure is enclosed within the magnetic field generating element.

4. The degaussing system of claim 1, wherein the elevated temperature is within a range of 300K to 650K or higher.

5. The degaussing system of claim 4, wherein the elevated temperature is within a range of 400K to 650K.

6. The degaussing system of claim 1, wherein the magnetic field generating element comprises an electromagnet solenoid coil configured to generate a directional field toward a center of the coil, wherein the MSD is disposed at the center of the coil.

7. The degaussing system of claim 6, wherein the electromagnet solenoid coil applies the magnetic field along the magnetic recording medium hard-direction.

8. The degaussing system of claim 6, wherein the electromagnet solenoid coil applies the magnetic field along the magnetic recording medium easy-direction.

9. The degaussing system of claim 1, wherein the magnetic field generating element is configured to generate a magnetic field in the range of 1 Tesla to 5 Tesla or higher.

10. The degaussing system of claim 1, further comprising a cooling system configured to cool the MSD after completion of degaussing of the MSD.

11. The degaussing system of claim 1, wherein the one or more heating elements comprises from one to four elements, wherein a heating element is disposed on at least one side of the MSD.

12. An improved degaussing system for sanitizing data stored in a magnetic storage device (MSD), the system comprising a magnetic field generating element configured to generate a directional field toward a media tray for retaining the MSD, the improvement comprising:
   one or more heating element disposed proximate to the media tray, the one or more heating element configured to heat the MSD to an elevated temperature for a duration of between 30 seconds and 1 hour before or during application of a magnetic field; and
   a thermal insulating element at least partially enclosing the one or more heating element, the thermal insulating element configured to isolate the magnetic field generating element from the one or more heating element.

13. The improved degaussing system of claim 12, wherein the thermal insulating element comprises a vacuum enclosure comprising enclosure walls having a vacuum therein.

14. The improved degaussing system of claim 12, wherein the elevated temperature is within a range of 300K to 650K or higher.

15. The improved degaussing system of claim 14, wherein the elevated temperature is within a range of 400K to 650K.

16. The improved degaussing system of claim 12, further comprising a cooling system configured to cool the MSD after completion of degaussing of the MSD.

17. A method for sanitizing data stored in a magnetic storage device (MSD), the method comprising:
- disposing the MSD in a media tray of a degaussing system;
- heating the MSD and the media tray to a predetermined temperature for a duration of between 30 seconds and 1 hour;
- after or concurrently with heating, activating a magnetic field generating element to apply a magnetic field to the MSD for a predetermined period;
- cooling the MSD; and
- removing the MSD from the system;
- wherein the magnetic field generating element at least partially encloses a thermal insulating element configured to thermally isolate a heating element that heats the MSD and media tray.

18. The method of claim 17, wherein thermal isolation is provided by a vacuum insulating element.

19. The method of claim 17, wherein the predetermined temperature is within a range of 300K to 650K or higher.

* * * * *